Sept. 23, 1958   H. G. F. RÖSZLER ET AL   2,853,142
MOTOR VEHICLE HAVING FRONT, REAR AND SIDE POWER TAKE-OFFS
Filed April 18, 1951   2 Sheets-Sheet 1

INVENTORS
Heinrich Röszler and
Albert Friedrich
BY
Michael S. Striker
Agt.

Sept. 23, 1958   H. G. F. RÖSZLER ET AL   2,853,142
MOTOR VEHICLE HAVING FRONT, REAR AND SIDE POWER TAKE-OFFS
Filed April 18, 1951   2 Sheets-Sheet 2

INVENTORS
Heinrich Röszler and
Albert Friedrich
BY
Michael S. Striker
agt

United States Patent Office 2,853,142
Patented Sept. 23, 1958

2,853,142

MOTOR VEHICLE HAVING FRONT, REAR AND SIDE POWER TAKE-OFFS

Heinrich G. F. Röszler and Albert Friedrich, Goppingen, Germany, assignors to Daimler-Benz Aktiengesellschaft, Stuttgart-Unterturkheim, Germany Application April 18, 1951, Serial No. 221,588

1 Claim. (Cl. 180—53)

Public Law 619, August 23, 1954
Patent expires February 20, 1970

The present invention relates to a motor vehicle which incorporates in itself many features making it suitable for many different uses.

The present invention has the purpose of providing a vehicle which unites the functions of a power supply means, a pulling means, a tool carrying means, a load-carrying means and a transportation means. This vehicle develops a speed which corresponds almost to the speed of a load-carrying vehicle and is provided with a spring-supported frame. Also in order to obtain good riding characteristics and an especially high pulling power, all of the wheels must be provided with a drive means.

The width of the vehicle frame cannot exceed the width of normal vehicles, and moreover the narrowest possible turning radius must be provided, as well as the necessary wheel size. The small frame of such a combination vehicle presents many problems in mounting all of the necessary parts such as, for example, a cab, a loading platform, a gas tank, a battery casing and a spare tire.

Among the objects of the present invention is the solution of the above-mentioned problems. Thus, it is an object of this invention to provide a single vehicle which will serve the purposes of a conventional tractor and at the same time be available for general transportation purposes.

A further object of the present invention is to provide a vehicle which is not of too great a size and in which the driving means for the wheels and the various other power supply means leave as much free space on the vehicle as possible in order to accommodate other parts of the vehicle.

A still further object of the present invention is to construct the parts of the vehicle in a very simple manner.

Another object of the present invention is to mount the parts of the vehicle in such a way that they are readily accessible for repair and replacement.

Still another object of the present invention is to provide the vehicle with many uniform parts so that the manufacture thereof is simplified and so that only a small space is required for storing replacement parts.

The present invention consists essentially of a vehicle wherein the motor, clutch and gear box unit, which forms the motor means, is mounted within the frame of the vehicle and has its longitudinal axis parallel to the longitudinal axis of the frame of the vehicle. The clutch means and drive means for the rear wheels of the vehicle are in alignment with the longitudinal axis of the motor means, and the clutch means and drive means for the front wheels of the vehicle are located at a side of the motor means and adjacent a lower part of the motor means. An additional drive means is located above the clutch means for the front wheels and extends from the same side of the motor means as the latter clutch means, and a further drive means extends from the opposite side of the motor means.

The advantage of this novel construction is that the front and rear axles can be connected to a motor means located within a small frame and that the front and rear axles and the parts associated therewith are of the same size and construction so that they may be made of interchangeable parts. This type of construction provides an economically feasible solution to the above-mentioned problems and at the same time is very advantageous for the storing of spare parts and for repairs. Moreover, the alignment of the rear wheel drive with the motor means permits the direct connection of the rear wheels to the motor means without any losses caused by intermediate power transmission means.

If, finally, it is further provided that a drive means for the front axle is located at one side of and beneath the frame and that above this there is located a second drive means located at the side of the motor means and from which may be driven forwardly and rearwardly extending power-supply drive shafts located essentially within the spaced occupied by the frame, it is possible to provide a vehicle having power supply shafts which are spaced from the area located above the frame. In this way there is provided between the frame and the loading platform of the vehicle a free space in which additional parts of the vehicle may be mounted, such as, for example, a spare wheel. On the outer side of the frame, there is thus provided an unobstructed space in which such parts as the battery casing and gas tank may be mounted.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
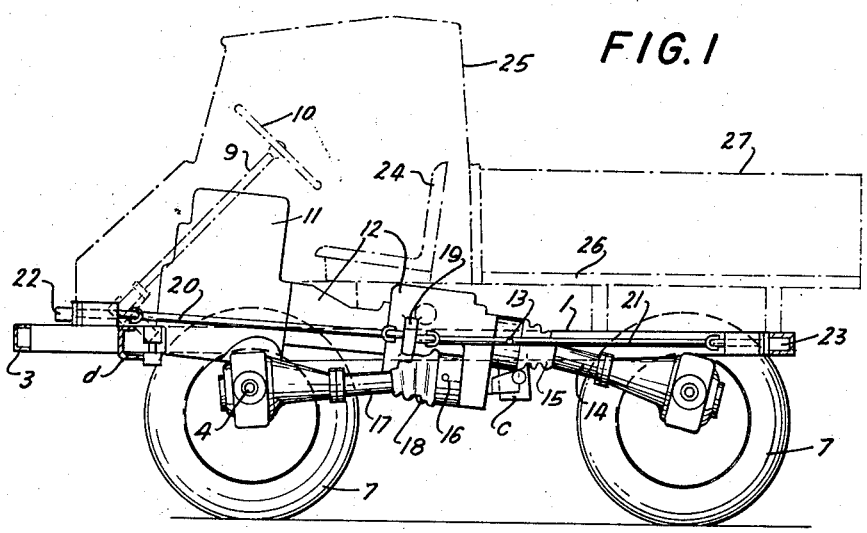
Fig. 1 shows a side view of the tractor taken along line A—B of Fig. 2 in the direction of the arrows and wherein the driving mechanism of the vehicle is illustrated in heavy lines.
Figure 2:
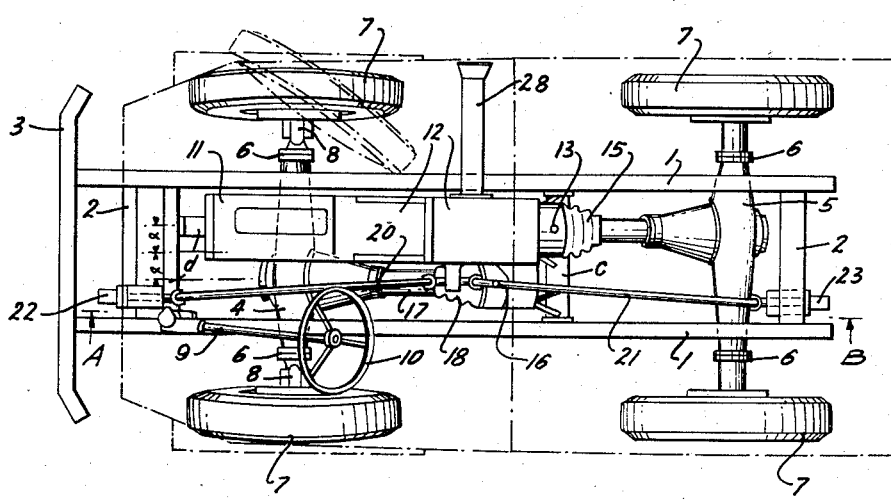
Fig. 2 shows a plan view of the structure shown in Fig. 1, and only the outer outline of this structure is illustrated.

The frame of the vehicle consists of longitudinal beams 1 and the cross beams 2 and bumper 3 connected thereto. Both the front axle 4 and the rear axle 5 carry the frame structure 1, 2 by means of springs (not shown). To the end flanges 6 of the front and rear axles 4 and 5 there are connected identical bearing structures for the four driven wheels 7, but it should be noted that the front wheels are provided with special linkages 8 operatively connected thereto and controlled by the steering wheel 10 acting through the steering column 9.

Within the frame 1, 2 there is located the motor 11 and the clutch and gear box assembly 12 which together form the motor means for the vehicle, and which are so located that the longitudinal axis thereof is located at a distance α from the longitudinal central axis of the frame 1, 2. It will be seen from the drawing that the motor means is located between the beams 1 of the frame and extends both above and below the frame 1, 2. At the rear end of the motor means there is located coupling means such as a universal joint 13 denoted schematically by a circle adapted to rotate a drive shaft located inside the tubular casing 14, said drive shaft being operatively connected to the rear axle 5. This coupling means 13 is located along the central longitudinal axis of the motor means.

A second coupling means 16 extends from a side of the motor means so that its center line is also located at a distance α from the longitudinal central axis of the frame 1, 2 in the same manner as the coupling means 13, but on the opposite side of the longitudinal axis of the frame from the coupling means 13. From the coupling means 16, the drive means within a tubular casing 17 for the front axle is driven. The inner ends of the two casings 14 and 17 and the two coupling means 13 and 16 are respectively provided with rubber covering sleeves 15 and 18.

The position of the two coupling means 13 and 16 are so chosen that the distance between the rear coupling means 13 and the rear axle 5 is equal to the distance between the coupling means 16 and front axle 4. With this arrangement of the coupling means 13 and 16, the front and rear axles together with the drive shafts connected thereto and the rubber sleeves mounted on the drive shafts and including all of the structure up to the flanges 6 can be made of indentical parts which are interchangeable.

As is evident from Fig. 1, the coupling means 16 is located beneath the plane of the frame 1, 2 and above this coupling means there extends from the side of the motor means a power take-off means 19 to which the forwardly and rearwardly extending power-supply drive shafts 20 and 21 are connected by universal joints. These drive shafts 20 and 21 are available for supplying power from the vehicle, and they respectively terminate in end portions 22 and 23 supported in bearings on the cross beams 2. The drive shafts 20 and 21 are almost completely located within the frame 1, 2.

On the other side of the motor means from that on which means 16 and 19 are located, there extends a power take-off shaft and the housing 28 in which it is enclosed, and this shaft may support a belt pulley wheel.

Means c and d fixed to the longitudinal beams 1 are provided for supporting the motor 11 and the clutch and gear box assembly 12.

The construction of the vehicle is shown in the drawings only in outline form and comprises the driver seat 24 located in the cab 25, as well as a loading platform 26 with walls 27.

Figure 3:
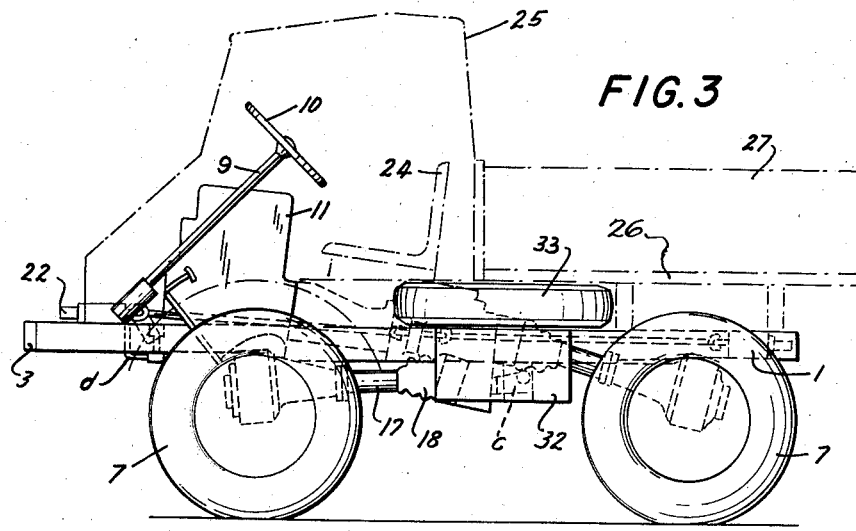
Fig. 3 is a view similar to Fig. 1 but shows the heavy outline parts of Fig. 1 in light lines, and shows the frame and parts mounted thereon in heavy outline.
Figure 4:
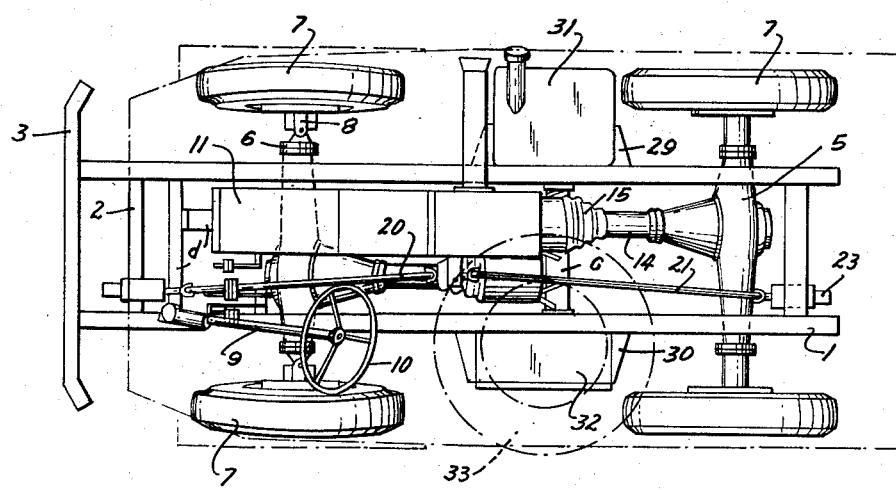
Fig. 4 is a plan view of the structure shown in Fig. 3, showing in heavy outline the same parts which are illustrated in heavy outline in Fig. 3.

The arrangement provides on the one hand a space between the wheels 7 and on the other hand a space between the loading platform 26 and the frame 1, 2, and Figs. 3 and 4 show how these spaces are used. On both sides of the frame, respectively, there are provided bracket supports 29 and 30 connected to the beams 1 and respectively support a gas tank 31 and a battery casing 32. Between the frame 1 and the loading platform 26 there is mounted a spare wheel 33 which may be moved into position from the side of the vehicle.

It will be understood that each of the elements described above, or two or more together, may also find a useful application in other types of motor vehicles differing from the types described above.

While the invention has been illustrated and described as embodied in a motor vehicle adapted to be used as a tractor, it is not intended to be limited to the details shown, since various modifications and structural changes may be made without departing in any way from the spirit of the present invention.

Without further anlysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a tractor, in combination, front and rear wheel-supported axle means; an elongated horizontal frame having a longitudinal frame axis and being resiliently supported at longitudinally spaced points thereof on said front and rear axle means; an elongated motor means supported on and located within said frame and having front and rear ends, said motor means having a longitudinal motor axis at one side of said longitudinal frame axis and said motor axis and frame axis being spaced from and parallel to each other when projected onto a common horizontal plane, said motor means being located over and extending forwardly and rearwardly of said front axle means and said motor means being longitudinally inclined with its front end located at a higher elevation than its rear end, said motor axis extending from a location over said front axle means and higher than said frame downwardly and rearwardly substantially to the elevation of said frame and said motor means having a rear end portion part of which is at an elevation lower than said frame; drive shaft means for said rear axle means extending rearwardly from said motor means and having an axis which, when it is projected onto said horizontal plane, is aligned with and forms an extension of the projection of said motor axis on said plane; a power take-off shaft projecting from the side of said motor means which is spaced farther from said longitudinal axis of said frame and having an axis of rotation extending normal to said longitudinal frame axis and being located in the middle region of said frame between said points of said frame; coupling means lower than said frame and connected to said part of said rear end portion of said motor means which is at an elevation lower than said frame, said coupling means projecting from a side of said motor means opposed to said side from which said power take-off shaft projects and located nearer to said frame axis than the latter side; additional drive shaft means for said front axle means extending forwardly from said coupling means and located at the side of said frame axis opposite from said motor axis, said additional drive shaft means being lower than said frame; a rotary power take-off means projecting from said side of said motor means nearer to said frame axis and located above said coupling means at the elevation of said frame; a pair of power take-off shafts extending in the longitudinal direction of said frame on the same side of said frame axis as said additional drive shaft means and having inner ends connected to said power take-off means for rotation therewith and outer ends projecting beyond said points of said frame and supported on opposite ends of said frame, respectively; and a tractor body carried by and located over said frame, said body having a loading platform located over and spaced from said frame to provide between said frame and platform a space for spare tires, brakes, power lifts, and the like.

References Cited in the file of this patent

UNITED STATES PATENTS

| | | |
|---|---|---|
| 1,512,562 | Radies | Oct. 21, 1924 |
| 1,525,940 | Kane | Feb. 10, 1925 |
| 1,648,536 | Brumbaugh | Nov. 8, 1927 |
| 1,801,744 | Hile et al. | Apr. 21, 1931 |
| 1,862,714 | Snow | June 14, 1932 |
| 1,876,561 | Brown | Sept. 13, 1932 |
| 1,933,539 | Brown | Nov. 7, 1933 |
| 1,957,221 | McCray | May 1, 1934 |
| 1,994,451 | Christenson | Mar. 12, 1935 |
| 2,103,543 | McCormick et al. | Dec. 28, 1937 |
| 2,146,107 | Biszantz | Feb. 7, 1939 |
| 2,168,033 | Johnston et al. | Aug. 1, 1939 |
| 2,206,342 | Wiebicke | July 2, 1940 |
| 2,232,992 | Alexander | Feb. 25, 1941 |

(Other references on following page)

UNITED STATES PATENTS

| | | | |
|---|---|---|---|
| 2,329,916 | Lamb | Sept. 21, | 1943 |
| 2,344,983 | Fageol | Mar. 28, | 1944 |
| 2,354,300 | Bock | July 25, | 1944 |
| 2,392,832 | Buckendale | Jan. 15, | 1946 |
| 2,406,797 | Buckendale | Sept. 3, | 1946 |
| 2,419,807 | Wilcox | Apr. 29, | 1947 |
| 2,428,281 | Jones | Sept. 30, | 1947 |
| 2,482,885 | Turner | Sept. 27, | 1949 |
| 2,625,231 | Martin | Jan. 13, | 1953 |

FOREIGN PATENTS

| | | | |
|---|---|---|---|
| 874,718 | France | May 18, | 1942 |
| 539,097 | Great Britain | Aug. 27, | 1941 |
| 662,398 | Great Britain | Dec. 5, | 1951 |
| 630,318 | Great Britain | Oct. 11, | 1949 |